(12) United States Patent
Seo et al.

(10) Patent No.: US 11,277,237 B2
(45) Date of Patent: Mar. 15, 2022

(54) METHOD FOR SETTING TRANSMISSION TIME INTERVAL FOR DEVICE-TO-DEVICE COMMUNICATION IN WIRELESS COMMUNICATION SYSTEM, AND DEVICE THEREFOR

(71) Applicant: LG Electronics Inc., Seoul (KR)

(72) Inventors: Hanbyul Seo, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 16/332,425

(22) PCT Filed: Sep. 13, 2017

(86) PCT No.: PCT/KR2017/010032
§ 371 (c)(1),
(2) Date: Mar. 12, 2019

(87) PCT Pub. No.: WO2018/052241
PCT Pub. Date: Mar. 22, 2018

(65) Prior Publication Data
US 2021/0297210 A1  Sep. 23, 2021

Related U.S. Application Data

(60) Provisional application No. 62/393,662, filed on Sep. 13, 2016.

(51) Int. Cl.
*H04W 4/00* (2018.01)
*H04L 5/00* (2006.01)
*H04W 72/04* (2009.01)

(52) U.S. Cl.
CPC ....... *H04L 5/0048* (2013.01); *H04W 72/0406* (2013.01)

(58) Field of Classification Search
USPC ........................................................ 370/329
See application file for complete search history.

(56) References Cited

U.S. PATENT DOCUMENTS

2016/0095092 A1* 3/2016 Khoryaev ............. H04W 64/00
370/329
2016/0219620 A1* 7/2016 Lee ....................... H04W 76/14

FOREIGN PATENT DOCUMENTS

KR   1020160018353 A   2/2016
KR   1020160055028 A   5/2016
(Continued)

OTHER PUBLICATIONS

LG Electronics, Inc.: "Introduction of V2V services based on LTE sidelink", R2-165836, 3GPP TSG-RAN2 Meeting 95, Gothenburg, Sweden, Aug. 22-26, 2016.

*Primary Examiner* — Maharishi V Khirodhar
(74) *Attorney, Agent, or Firm* — Dentons US LLP

(57) ABSTRACT

Disclosed in the present application is a method by which a first terminal transmits a side link signal to a second terminal in a wireless communication system. Particularly, the method for transmitting a side link signal comprises the steps of: transmitting, in a first number of transmission time units, a control signal, which includes resource allocation information of a data signal, and a first reference signal for the control signal; and transmitting, in a second number of transmission time units, the data signal and a second reference signal for the data signal, wherein the transmission time units have two or more symbols, the first reference signal is transmitted in fixed symbol indexes irrespective of the first number of transmission time units, and symbol indexes in which the second reference signal is transmitted are determined on the basis of the second number of transmission time units.

6 Claims, 6 Drawing Sheets

(56) References Cited

FOREIGN PATENT DOCUMENTS

| WO | 2015/122629 A1 | 8/2015 |
| WO | 2015/142900 A1 | 9/2015 |

\* cited by examiner (A) CONTROL-PLANE PROTOCOL STACK (B) USER-PLANE PROTOCOL STACK

METHOD FOR SETTING TRANSMISSION TIME INTERVAL FOR DEVICE-TO-DEVICE COMMUNICATION IN WIRELESS COMMUNICATION SYSTEM, AND DEVICE THEREFOR This application is a 35 USC § 371 national stage entry of international application no. PCT/KR2017/010032 filed on Sep. 13, 2017, and claims priority to U.S. provisional application No. 62/393,662 filed on Sep. 13, 2016, all of which are hereby incorporated by reference in their entireties as if fully set forth herein.

TECHNICAL FIELD

The present disclosure relates to a wireless communication system, and more particularly to, a method of configuring a transmission time interval for direct D2D communication in a wireless communication system and device therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the above discussion, the present disclosure proposes a method of configuring a transmission time interval for direct D2D communication in a wireless communication system and device therefor.

Technical Solution

In an aspect of the present disclosure, provided is a method of transmitting a sidelink signal by a first User Equipment (UE) to a second UE in a wireless communication system. The method may include: transmitting a control signal including resource allocation information of a data signal and a first reference signal for the control signal in a first number of transmission time units; and transmitting the data signal and a second reference signal for the data signal in a second number of transmission time units. The transmission time unit may be composed of two or more symbols, the first reference signal may be transmitted in symbols with fixed indices regardless of the first number of transmission time units, and indices of symbols in which the second reference signal is transmitted may be determined based on the second number of transmission time units.

In this case, transmitting the second reference signal may include: re-indexing symbols included in the second number of transmission time units; and determining the indices of the symbols in which the second reference signal is transmitted, using the re-indexed symbols.

More specifically, the symbols in which the first reference signal is transmitted may be determined to have predefined absolute symbol indices, and the symbols in which the second reference signal is transmitted may be determined to have relative symbol indices within the second number of transmission time units.

In another aspect of the present disclosure, provided is a method of receiving a sidelink signal by a first User Equipment (UE) from a second UE in a wireless communication system. The method may include: receiving a control signal including resource allocation information of a data signal and a first reference signal for the control signal in a first number of transmission time units; and receiving the data signal and a second reference signal for the data signal in a second number of transmission time units. The transmission time unit may be composed of two or more symbols, the first reference signal may be received in symbols with fixed indices regardless of the first number of transmission time units, and indices of symbols in which the second reference signal is received may be determined based on the second number of transmission time units.

Similarly, receiving the second reference signal may include: re-indexing symbols included in the second number of transmission time units; and determining the indices of the symbols in which the second reference signal is received, using the re-indexed symbols.

More specifically, the symbols in which the first reference signal is received may be determined to have predefined absolute symbol indices, and the symbols in which the second reference signal is received may be determined to have relative symbol indices within the second number of transmission time units.

Additionally, the first number may be a fixed value, and the resource allocation information may include information on the second number. In particular, the resource allocation information may include information on a minimum index in the second number of transmission time units.

Advantageous Effects

According to the present disclosure, a transmission time interval for direct D2D communication can be efficiently configured.

It will be appreciated by persons skilled in the art that the effects that can be achieved through the present disclosure are not limited to what has been particularly described hereinabove and other advantages of the present disclosure will be more clearly understood from the following detailed description.

BEST MODE FOR INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term Base Station (BS)' may be used to cover the meanings of terms including Remote Radio Head (RRH), evolved Node B (eNB or eNode B), Reception Point (RP), relay, etc.

Figure 1:
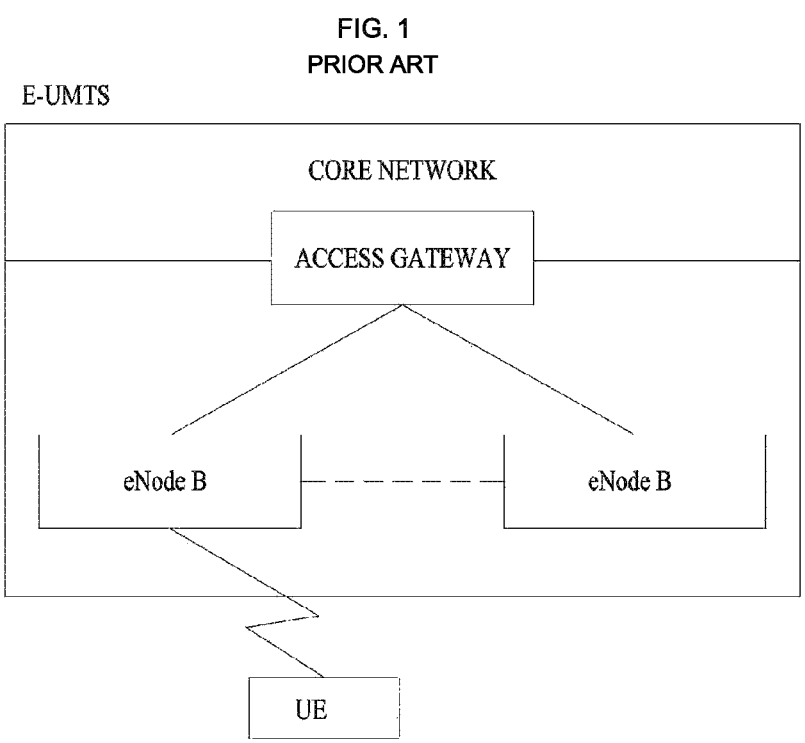
FIG. 1 illustrates a configuration of an Evolved Universal Mobile Telecommunications System (E-UMTS) network as an example of a wireless communication system.
Figure 2:
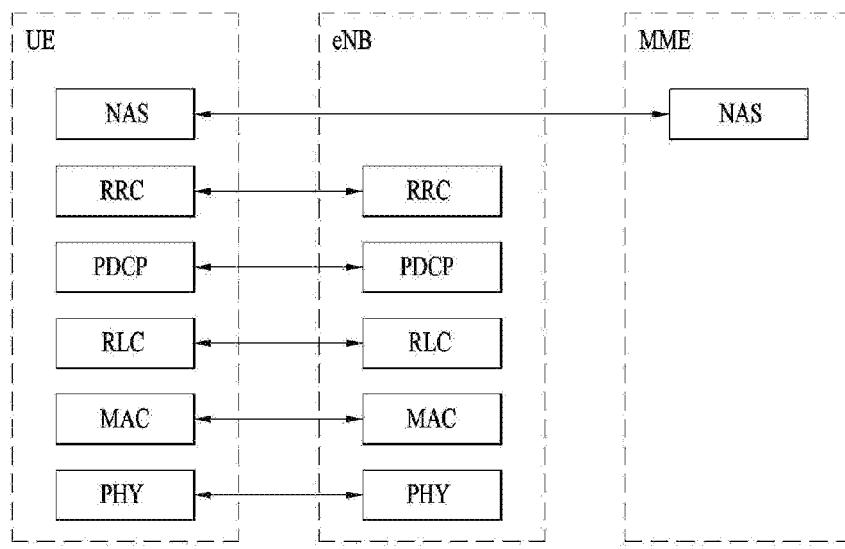
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
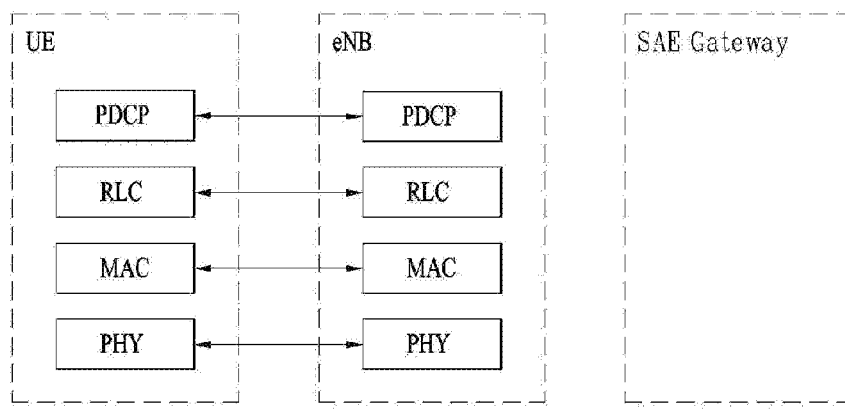

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
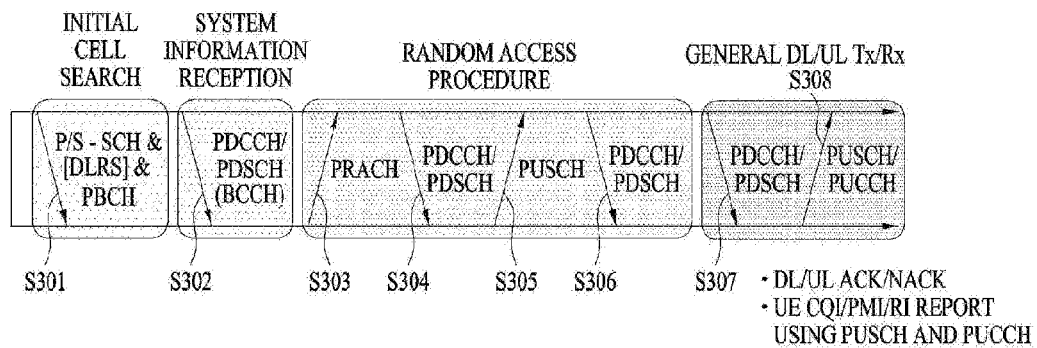
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
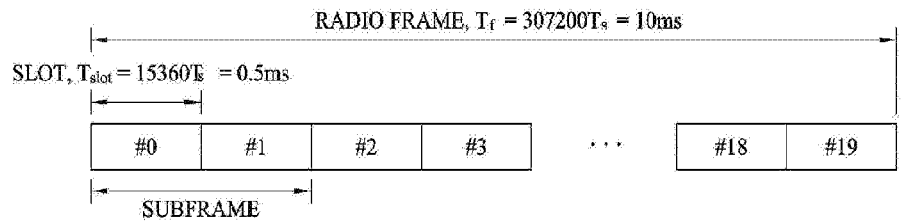
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
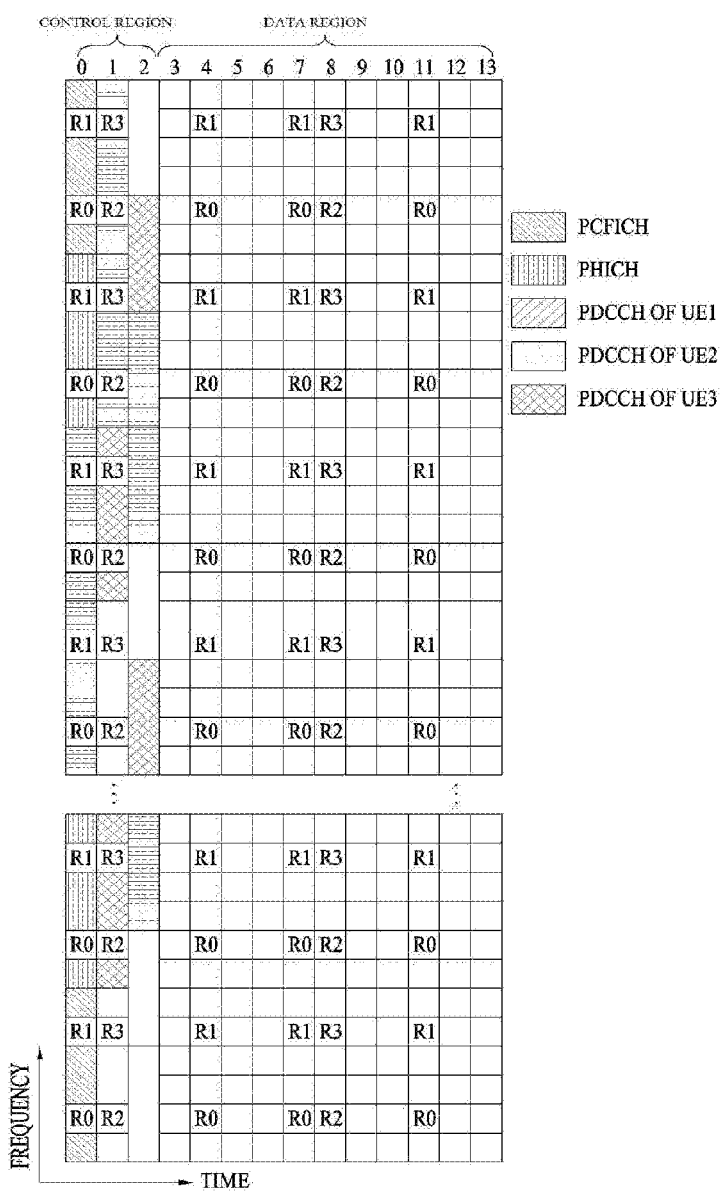
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
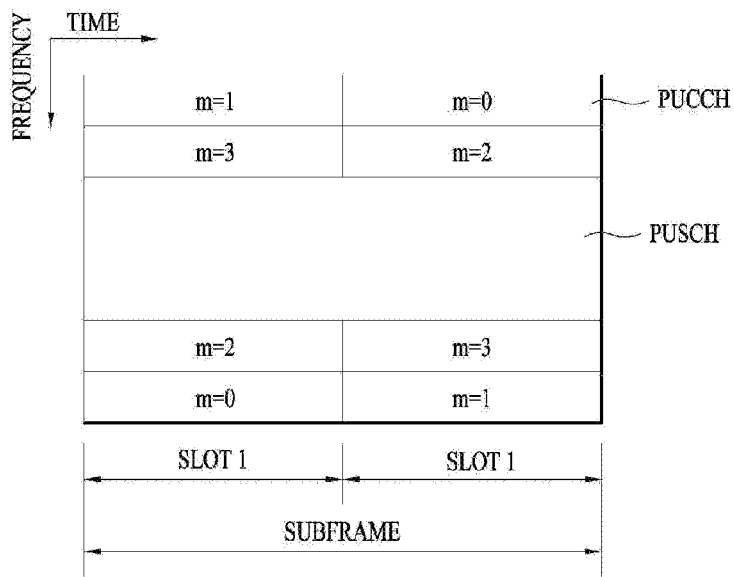
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
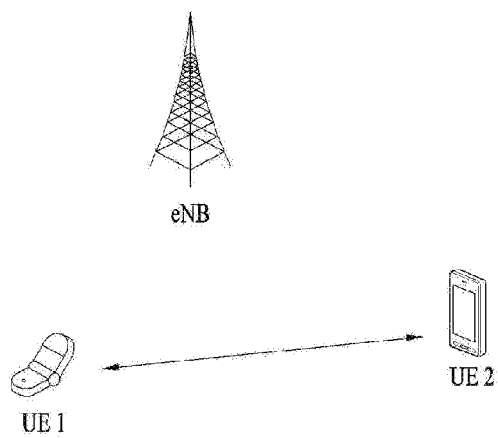
FIG. 7 is a diagram illustrating the concept of device-to-device (D2D) communication.

FIG. 7 is a diagram illustrating the concept of device-to-device (D2D) communication.

Referring to FIG. 7, for D2D communication where a UE performs direct wireless communication with another UE, that is, for direct communication between UEs, an eNB can transmit a scheduling message indicating D2D transmission and reception. Upon receiving the D2D scheduling message from the eNB, a UE participating in the D2D communication performs the transmission and reception operation indicated by the D2D scheduling message. Herein, although a UE means a user terminal, a network entity such as an eNB may be regarded as kind of a UE if the network entity transmits/receives signals according to a communication scheme between UEs. In addition, an eNB can receive a D2D signal transmitted from a UE, and a signal transmission and reception method for a UE, which is designed for D2D communication, can also be applied when a UE transmits an uplink signal to an eNB.

Hereinafter, a link between UEs is referred to as a D2D link and a link for communication between a UE and an eNB is referred to as an NU link. Or, a link directly connected between UEs may be referred to as a SideLink (SL) in the concept compared with an uplink or a downlink.

Meanwhile, it is important that when a UE transmits a sidelink signal, the UE coexists with another UE without interference therebetween. To this end, the UE can perform Listen-Before-Talk (LBT). That is, before transmitting the sidelink signal, the UE may observe signals from other UEs on a corresponding channel and then perform its transmission by selecting resources capable of avoiding collisions.

As an example of the LBT operation, a UE may operate as follows. The UE selects a random back-off value before transmitting a sidelink signal. If there is no transmission from other UEs during a predetermined time period, the UE decreases the back-off value by 1 and repeats this operation until the back-off value becomes 0. When the back-off value is 0, the UE starts the transmission. As another example of the LBT operation, a UE may operate as follow. The UE observes a channel during a predetermined time. If it is determined that another UE occupies a specific resource (for example, if another UE reserves the specific resources to use in the future or if the specific resource periodically shows high energy), the UE selects resources except the corresponding resource.

Meanwhile, different UEs may transmit signals on different frequencies at the same time (for example, within one Transmission Time Interval (TTI)). In this case, the LBT can be applied. However, if a receiving UE receives the signals from the different UEs in a situation that time synchronization is not completed, the receiving UE should perform the reception by separately managing the time synchronization of the individual UE signals. As a result, the complexity of the sidelink reception operation increases. In addition, when sidelink signal transmission is performed based on OFDM, if a difference between transmission times of two UEs is out of the error range defined by a Cyclic Prefix (CP), frequencies cannot be separated using the OFDM scheme. Consequently, interference occurs therebetween. Therefore, in particular, when different UEs transmit sidelink signals on different frequencies based on the OFDM scheme, OFDM symbol boundaries should be synchronized at least within a certain level of error. It could be interpreted to mean that the time at which a specific UE can initiate sidelink signal transmission is limited to a specific time point such as a boundary between OFDM symbols.

To transmit and receive a sidelink signal more efficiently in the above situation, the present disclosure proposes a method of determining a sidelink signal transmission time of each UE.

First, it may be regulated that each UE is synchronized with respect to a predetermined reference time and initiates transmission only at a specific time within the entire time period. This could be interpreted to mean that from the system-level perspective, the entire time period is divided into certain units and each UE uses an integer number of resources whenever performing transmission. By doing so, all UEs can perform transmission being synchronized at least in terms of transmission units, thereby solving the aforementioned problem. It is a matter of course that the LBT operation can be applied. That is, a UE can determine from which transmission unit the UE can start transmission based on transmission performed by another UE, which was previously observed.

Figure 8:
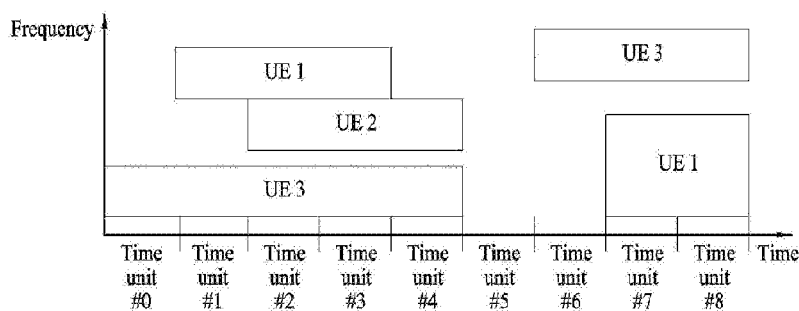
FIG. 8 illustrates that each of a plurality of UEs transmits a sidelink signal according to an embodiment of the present disclosure.

FIG. 8 illustrates that each of a plurality of UEs transmits a sidelink signal according to an embodiment of the present disclosure.

Referring to FIG. 8, UE 1 starts sidelink signal transmission at time unit #1 and ends the sidelink signal transmission at time unit #3. UE 2 starts sidelink signal transmission at time unit #2 and ends the sidelink signal transmission at time unit #4. UE 3 starts sidelink signal transmission at time unit #0 and ends the sidelink signal transmission at time unit #4.

In this case, even though multiple UEs perform transmission at a specific time, a receiving UE may properly receive based on reception synchronization corresponding to a transmission unit. For example, in the case of OFDM, a receiving UE can separate other UEs' FDMed signals from each other by performing the IFFT operation once every time.

One time unit may be composed of one or a plurality of OFDM symbols. In some cases, a specific signal may be additionally transmitted before start of a time unit for sidelink transmission in order to prevent another UE from determining that the corresponding resource is empty. The transmission of such an exception signal may be allowed before the time unit for the sidelink transmission.

In particular, one time unit may be generally configured to be slightly shorter than the time required from start to end of transmission on one sidelink transmission channel. This is because a long time unit is effective in reducing time delay until transmission is initiated and preventing another device from occupying a channel.

Meanwhile, when transmission is performed as shown in FIG. 8, a receiving UE should know from which time unit to which time unit each UE occupies for sidelink transmission.

To this end, the time length of a sidelink channel may be fixed. In this case, since, even though different UEs start transmission at different times, each transmission has the same length, a receiving UE can detect sidelink transmission by checking the sidelink transmission in each time unit.

Figure 9:
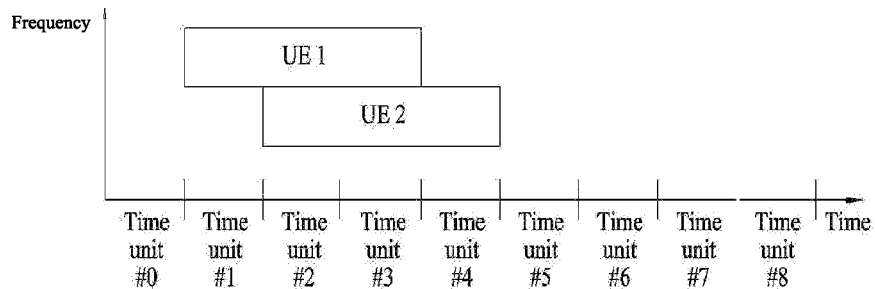
FIG. 9 illustrates transmission of sidelink channels with a fixed time length according to an embodiment of the present disclosure.

FIG. 9 illustrates transmission of sidelink channels with a fixed time length according to an embodiment of the present disclosure.

In FIG. 9, it is assumed that each UE uses three time units for transmission. A receiving UE attempts to receive on the assumption that there is a transmission using time units #0, #1, and #2 and then determines whether a valid signal is decoded during a CRC process. While performing the above operation, the receiving UE stores signals received in time units #1 and #2 in a buffer.

In the example of FIG. 9, there is no successful reception when the reception attempt is made using time units #0, #1, and #2. After completing the above operation, the receiving UE attempts to receive on the assumption that there is a transmission using time units #1, #2, and #3. In this case, the receiving UE can successfully receive a transmission from UE 1. Similarly, when attempting to receive on the assumption that there is a transmission using time units #2, #3, and #4, the receiving UE can successfully receive a transmission from UE 2.

By repeating the above operation, the receiving UE can decode signals from multiple UEs even though the signals are transmitted at different times. To simplify the operation of the receiving UE, the amount and candidate locations of frequency resources, an MCS, etc. used by a transmitting UE may be fixed to specific values or selected from among a small number of candidates. If fixing the time length of a sidelink channel to a certain value excessively restricts UE operations, it may be regulated that the time length of each sidelink channel is selected as one of a plurality of candidates, and the receiving UE may be configured to attempt to receive for all of the plurality of candidates.

When UEs operates as shown in the example of FIG. 9, the receiving UE needs to grasp reference signal sequences to be used by transmitting UEs at their own transmission times in advance. In general, a reference signal sequence is configured to vary depending on time for randomization between different transmissions. However, in this case, the receiving UE cannot know the time point at which a reference signal starts to vary so that the receiving UE cannot perform reception.

Thus, in the case of a channel where the operation described with reference to FIG. 9 is performed, a reference signal sequence may be configured to be unchanged even though a time unit varies. For example, when reference signals are transmitted in a plurality of symbols constituting one time unit and when a symbol index is used for reference signal generation, different reference signals may be transmitted in different symbols included in the same time unit, but the same reference signal may be transmitted in symbols located at the same position in the next time unit. Alternatively, if both the transmitting and receiving UEs know the absolute indices of time units, the absolute indices of the time units can be used for the reference signal generation so that the receiving UE can know the reference signal sequence of each symbol in advance.

The above-described operation can be partially applied to determine the location of a reference signal. For example, the reference signal location may be determined based on the absolute time known to both the transmitting and receiving UEs. As a result, the relative locations of reference signals may vary in each channel transmission period.

Figure 10:
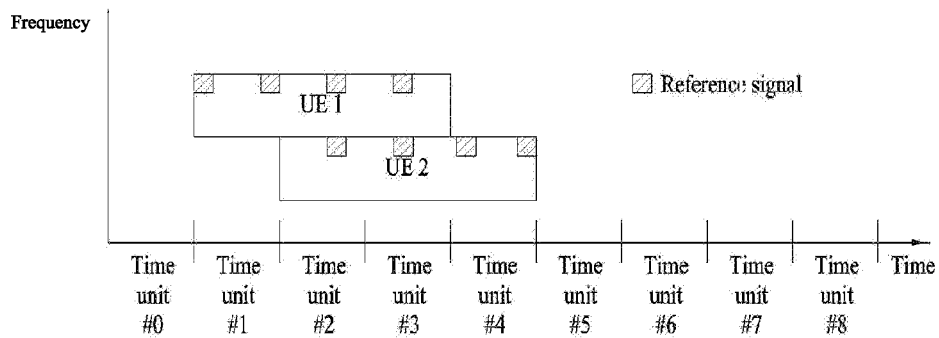
FIG. 10 illustrates a method of determining the locations of reference signals for sidelink signal transmission according to an embodiment of the present disclosure.

FIG. 10 illustrates a method of determining the location of a reference signal for sidelink signal transmission according to an embodiment of the present disclosure.

In FIG. 10, it is assumed that when one time unit is composed of four symbols, one channel occupies three time units for transmission thereof and a reference signal is located at one of three symbols. In this case, from the system-level perspective, the locations of reference signals are fixed as shown in FIG. 10, and each transmitting UE transmits reference signals included in its own transmission period.

However, when the system operates as described above, there may be significant restrictions on the amount of time/frequency resources used for sidelink transmission, a Modulation and Coding Scheme (MCS), etc. To overcome the restrictions, although a UE transmits control information as described above, the UE may be configured to provide information on corresponding data through the control information and freely determine the configuration for the data transmission such as time/frequency resource locations, an MCS, etc.

Figure 11:
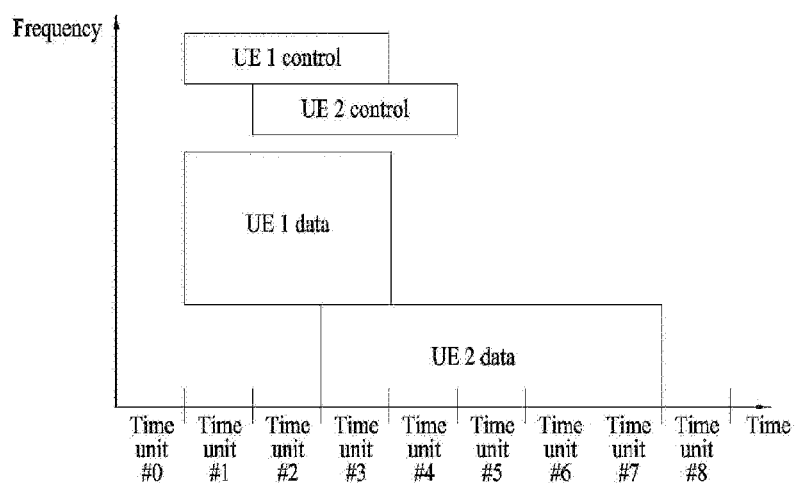
FIG. 11 illustrates an example of transmitting sidelink control information and sidelink data information according to an embodiment of the present disclosure.

FIG. 11 illustrates an example of transmitting sidelink control information and sidelink data information according to an embodiment of the present disclosure.

Referring to FIG. 11, it can be seen that each of UE 1 and UE 2 transmits sidelink control information with restrictions on the amount of time/frequency resources, an MCS, etc. as described above but transmits sidelink data with no restriction. However, in this case, certain restrictions may exist.

For example, it may be prohibited to start sidelink data transmission earlier than a predetermined time before transmission of sidelink control information, which directly schedules the sidelink data transmission, is started. The reason for this is to properly limit the number of received signals that a receiving UE should store for the sidelink data transmission before receiving the sidelink control information. More simply, it may be regulated that the sidelink data transmission cannot be started before the transmission of the control information that directly schedules the sidelink data transmission is started.

As another example, it may be regulated that sidelink data transmission is always started after a predetermined time from the time at which transmission of sidelink control information, which directly schedules the sidelink data transmission, is started. In particular, the sidelink data and sidelink control information may be configured to be always transmitted at the same time. In this case, since it is not necessary to indicate the start time of the sidelink data through the sidelink control information, the overhead of the sidelink control information can be reduced. As a further example, it may be regulated that sidelink data transmission is started immediately after transmission of sidelink control information, which directly schedules the sidelink data transmission, is ended (that is, at the earliest time at which the sidelink data can be transmitted after the transmission of the sidelink control information is ended).

Additionally, it may be prohibited to end sidelink data transmission earlier than a predetermined time before transmission of sidelink control information, which directly schedules the sidelink data transmission, is ended. The reason for this is to prevent an excessive increase in the overhead of the sidelink control information when the time consumed for the sidelink data transmission is much shorter than that for the sidelink control information transmission. More simply, it may be regulated that the sidelink data transmission cannot be ended before the transmission of the control information that directly schedules the sidelink data transmission is ended. Further, it may be regulated that the sidelink data transmission is ended when the transmission of the control information that directly schedules the sidelink data transmission is ended.

The above-described method can be applied to a reference signal sequence of sidelink data. However, in this case, even if transmissions from different UEs partially overlap, reference signals collide to each other. As a result, reception performance may be significantly degraded. That is, for sidelink data, it is possible to use a method different from that used for sidelink control information since a receiving UE can accurately know, from the sidelink control information, when sidelink data transmission is performed and which resources are used for the sidelink data transmission.

For example, re-indexing may be performed except the time allocated for a corresponding sidelink data channel, and then reference signals may be generated based on indices. Referring to FIG. 11, in the case of sidelink control information, UE 1 generates reference signals for a sidelink control information channel using indices #1, #2, and #3, whereas in the case of sidelink data, UE 1 may allocate indices #0, #1, and #2 by re-indexing occupied time units and then generate reference signals based on indices #0, #1, and #2.

In the case of a sidelink data channel, the locations of reference signals may be relatively determined within a transmission period. In particular, in contrast to sidelink control information transmitted with a low modulation order and coding rate, sidelink data can be transmitted with a high modulation order and coding rate. This is because since channel estimation performance becomes more sensitive when transmission is performed with a high modulation order and coding rate, a channel estimation scheme capable of optimally using relatively fixed reference signals needs to be applied to sidelink data.

Figure 12:
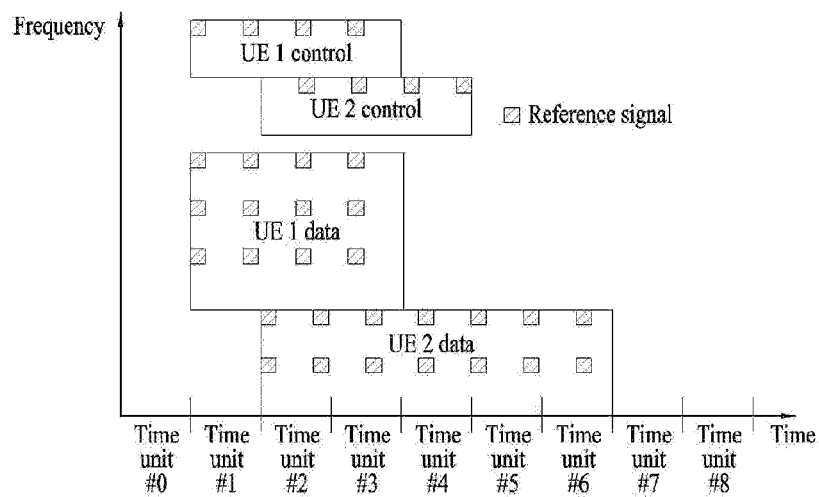
FIG. 12 illustrates another example of transmitting sidelink control information and sidelink data information according to an embodiment of the present disclosure.

FIG. 12 illustrates another example of transmitting sidelink control information and sidelink data information according to an embodiment of the present disclosure.

Referring to FIG. 12, it can be seen that in the case of data transmission at UE 2, reference signals therefor are located at relative positions within a transmission period unlike those for control information. Specifically, the location of a sidelink reference signal can be determined as either an absolute time or a relative time. Accordingly, the present disclosure proposes to determine the location of a reference signal for sidelink control information as an absolute time and determine the location of a reference signal for sidelink data as a relative time. In FIG. 12, it is assumed that a reference signal for sidelink data transmission is located every three symbols for optimal positioning.

More specifically, although FIG. 12 shows that the locations of the reference signals for the sidelink control information of UE 1 are determined as absolute times and the locations of the reference signals for the sidelink data of UE 1 are determined as relative times, it could be interpreted to mean that the same time indices are applied to the reference signals since the time length allocated for the control information transmission is equal to that for the data transmission.

However, it can be seen that in the case of UE 2, since the locations of the reference signals for the sidelink control information are determined as absolute times and the locations of the reference signals for the sidelink data are determined as relative times, the reference signals are transmitted at different locations.

In this case, since a receiving UE cannot know whether control information exists or not, the receiving UE needs to continually attempt detection thereof. If a reference signal location is fixed, channel estimation information can be reused, thereby simplifying UE operation. However, a receiving UE is able to know whether there is data from control information. Thus, if a reference signal is located at a relative position, an optimal pattern can be obtained. In addition, in the case of data, the density of reference signals can be adjusted according to a modulation order, a coding rate, a UE speed, etc., and the adjustment operation can be facilitated if the location of a data reference signal is determined from a relative position within a data transmission period. The above configuration can be extended into a method of applying absolute time to a discovery channel of which the presence is uncertain among normal sidelink channels.

If a control information transmission period is not completely identical to a data transmission period, a UE may transmit only data in a specific period. In this case, there occurs a problem how to handle transmission power, which was reserved for control information transmission.

In this case, even though control information is not transmitted, data transmission power can be maintained without any changes. According to this method, reference signals within a data transmission period can be combined so that it is helpful to estimate a channel. Also, the method may allow a UE to transmit different control information for next data transmission if the UE is currently transmitting data only. In other words, if control information transmission partially overlaps with data transmission, a UE may allocate transmission power for both the control information transmission and the data transmission when starting the control information transmission and the data transmission, respectively, and then maintain the transmission power until the control information transmission and the data transmission end.

Alternatively, in a period where control information is not transmitted, transmission power reserved for control information transmission may be used for data transmission. Since a receiving UE can recognize the fact that the power for the control information transmission is used for the data transmission, the receiving UE can grasp that data transmission power varies between two periods and reflect the power variation in demodulation. In this case, if different control information, which the receiving UE does not know, is additionally transmitted, the power adjustment should be performed again. As a result, it may be regulated that a transmitting UE is not allowed to transmit different control information before end of data transmission. Alternatively, the above rule can be relaxed as follow: a transmitting UE may be allowed to transmit new control information if the transmitting UE is able to maintain the previous data transmission power. However, since a signal may be distorted if power is changed during transmission, channel estimation needs to be performed by distinguishing between boundaries of multiple pieces of control information.

Meanwhile, the principles of the present disclosure can be applied even when different UEs use different subcarrier spacing. In this case, the same time units can be defined regardless of the subcarrier spacing used by each UE, and the above-described operations can be performed based on the same time units. However, if different subcarrier spacing is used, each symbol may have a slightly different length so that one defined time unit may not include an integer number of symbols. To solve this problem, a maximum integer number of symbols may be included in one time unit, and the remaining part may be used to transmit a random signal or Cyclic prefixes (CPs) of some symbols. By doing so, it is possible to completely fill one time unit.

Figure 13:
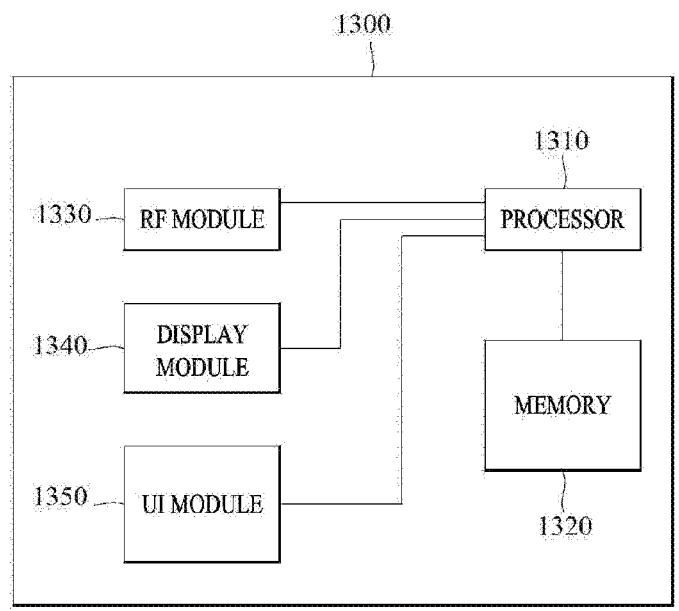
FIG. 13 is a block diagram of a communication apparatus according to an embodiment of the present invention.

FIG. 13 is a block diagram of a communication apparatus according to an embodiment of the present invention.

Referring to FIG. 13, a communication apparatus 1300 includes a processor 1310, a memory 1320, an RF module 1330, a display module 1340 and a user interface module 1350.

The communication apparatus 1300 is illustrated for convenience of description and some modules may be omitted. Furthermore, the communication apparatus 1300 may further include necessary modules. Some modules of the communication apparatus 1300 may be subdivided. The processor 1310 is configured to perform operations according to the embodiments of the present invention, described with reference to attached drawings. Refer to descriptions of FIGS. 1 to 12 for detailed operations of the processor 1310.

The memory 1320 is connected to the processor 1310 and stores an operating system, applications, program code, data, etc. The RF module 1330 is connected to the processor 1310 and converts baseband signals into RF signals or converts RF signals into baseband signals. To achieve this, the RF module 1330 performs analog conversion, amplification, filtering and frequency upconversion or reverse operations thereof. The display module 1340 is connected to the processor 1310 and displays various types of information. The display module 1340 may use a well-known element such as an LCD (Liquid Crystal Display), LED (Light Emitting Diode), OLED (Organic Light Emitting Diode) or the like. However, the display module 1340 is not limited thereto. The user interface module 1350 may be connected to the processor 1310 and configured in the form of a combination of well-known user interfaces such as a keypad, touchscreen and the like.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In some cases, a specific operation described herein as performed by a base station can be performed by an upper node of the base station. That is, in a network constructed with a plurality of network nodes including a base station, it is apparent that various operations performed for communication with a UE can be performed by the base station or other network nodes except the base station. In this case, the term 'Base Station (BS)' can be replaced with terminologies such as a fixed station, a Node B, an eNodeB (eNB), an access point, etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method of configuring a transmission time interval for direct D2D communication in a wireless communication system and device therefor are described based on the 3GPP LTE system, the method and device can be applied to various wireless communication systems as well as the 3GPP LTE system.

What is claimed is:

1. A method of transmitting a sidelink signal by a first User Equipment (UE) to a second UE in a wireless communication system, the method comprising:

transmitting a control signal including resource allocation information fora data signal and a first reference signal for the control signal in a first number of symbols; and transmitting the data signal and a second reference signal for the data signal in a second number of symbols, wherein the first reference signal is transmitted in symbols having fixed indices, and wherein indices of the symbols in which the second reference signal is transmitted are determined based on the first number of symbols and the second number of symbols.

2. The method of claim 1, wherein transmitting the second reference signal comprises:

re-indexing the second number of symbols; and determining the indices of the symbols in which the second reference signal is transmitted, using the second number of re-indexed symbols.

3. The method of claim 1, wherein the symbols in which the first reference signal is transmitted are determined to have predefined absolute symbol indices, and the symbols in which the second reference signal is transmitted are determined to have relative symbol indices within the second number of symbols.

4. A method of receiving a sidelink signal by a first User Equipment (UE) from a second UE in a wireless communication system, the method comprising:

receiving a control signal including resource allocation information fora data signal and a first reference signal for the control signal in a first number of symbols; and receiving the data signal and a second reference signal for the data signal in a second number of symbols, wherein the first reference signal is received in symbols having fixed indices, and wherein indices of the symbols in which the second reference signal is received are determined based on the first number of symbols and the second number of symbols.

5. The method of claim 4, wherein receiving the second reference signal comprises:

re-indexing the second number of symbols; and determining the indices of the symbols in which the second reference signal is received, using the second number of re-indexed symbols.

6. The method of claim 4, wherein the symbols in which the first reference signal is received are determined to have predefined absolute symbol indices, and the symbols in which the second reference signal is received are determined to have relative symbol indices within the second number of symbols.

* * * * *